United States Patent
Fearnow et al.

[15] 3,658,617
[45] Apr. 25, 1972

[54] METHOD FOR FORMING A LAMINATED FLOOR COVERING

[72] Inventors: Edgar C. Fearnow; William E. Martin, both of Lancaster, Pa.

[73] Assignee: Armstrong Cork Company, Lancaster, Pa.

[22] Filed: July 17, 1970

[21] Appl. No.: 55,671

[52] U.S. Cl................156/235, 156/237, 156/238, 156/244, 156/249, 156/285, 156/550, 156/555
[51] Int. Cl.........................B44c 1/18, B44c 3/02
[58] Field of Search............156/230, 235, 237, 238, 240, 156/241, 247, 249, 244, 288, 287, 289, 550, 555

[56] References Cited

UNITED STATES PATENTS

| | | | |
|---|---|---|---|
| 3,165,432 | 1/1965 | Plaskett | 156/244 |
| 3,222,237 | 12/1965 | McKelvy | 156/244 X |
| 3,230,126 | 1/1966 | Craver, Jr. | 156/244 |
| 3,356,556 | 12/1967 | Violette et al. | 156/244 |
| 3,539,426 | 11/1970 | Nakai et al. | 156/249 |
| 3,544,405 | 12/1970 | Nakai et al. | 156/249 |
| 3,421,964 | 1/1969 | Arbil | 156/244 |
| 3,526,000 | 8/1970 | Williams | 156/244 X |
| 3,560,288 | 2/1971 | Mkami | 156/235 |

*Primary Examiner*—Benjamin R. Padgett
*Assistant Examiner*—Roger S. Gaither
*Attorney*—Clifford B. Price

[57] ABSTRACT

The method involves the steps of forming a decorative wear layer on an expendable, strippable backing, removing the strippable backing from the wear layer while maintaining the wear layer in a stable state, and passing the wear layer into the nip of a roll structure along with an extruded adhesive, a reinforcing member and a foam or other permanent backing so that there is formed a laminated structure consisting of the wear layer, a reinforcing structure and a permanent backing all adhesively bonded to each other.

1 Claims, 1 Drawing Figure

Patented April 25, 1972
3,658,617
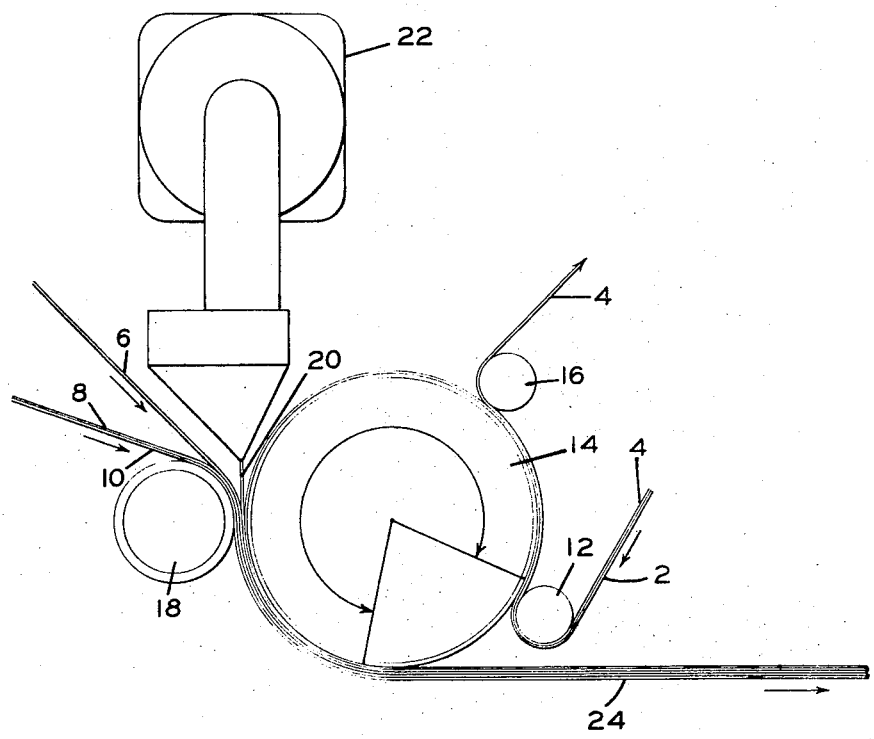
INVENTOR
EDGAR C· FEARNOW
WILLIAM E. MARTIN
BY
ATTORNEY

METHOD FOR FORMING A LAMINATED FLOOR COVERING

BACKGROUND OF THE INVENTION

1. Field of the Invention

The invention herein is directed to a method of forming a floor product and, more particularly, to the forming of a laminated structure floor product.

2. Description of the Prior Art

A laminated floor structure with a reinforcing layer is shown in both U. S. Pat. Nos. 3,002,868 and 3,360,422. Both these patents teach the laminating of a wear layer structure, reinforcing layer and backing layer of foam material. An adhesive layer is introduced between the wear layer and backing layer to bond the assembly together. The latter patent even mentions briefly that the foam backing could be optionally on a loose carrier and removed from the release carrier just prior to lamination. In both of those patents the wear layer is a self-supporting structure, and the pattern design was such that it was not critical to keep the pattern in a stable condition from the time that the pattern is printed until such time as it is fastened to its permanent backing.

U. S. Pat. Nos. 3,165,432 and 3,421,964 both disclose laminating structures in which a suction roll is utilized to hold one of the elements being laminated.

While each of the individual elements utilized in the method herein may be old in the art, it is the novel combination of steps herein which makes it possible to produce a product which previously could not be produced.

SUMMARY OF THE INVENTION

A decorative wear layer is formed by depositing the material of the wear layer on a temporary backing. The wear layer is provided with a decorative appearance which may be a printing or an embossing, and this decorative wear layer is meant to be coordinated with adjacent sheets of the same material so that there will be a pattern match between the pattern on one sheet with the pattern on the adjacent sheet. Therefore, it is very desirable that the pattern in the wear layer be maintained with the same dimensions that it is printed with. The wear layer with its temporary backing is fed to a laminating structure. A vacuum roll forms one roll of the laminating roll structure. The wear layer with its temporary backing passes around the suction roll. The suction roll has the wear layer in contact with its surface, and the suction within the roll holds the wear layer in a very stable condition on the periphery of the suction roll. The temporary backing can now be stripped off the wear layer without distorting the pattern dimensions of the wear layer. The wear layer is then carried on around to the nip of the consolidating roll. At this point, the wear layer, a foam backing, reinforcing layer and adhesive are joined together to provide the wear layer with a permanent backing. The suction roll holds the wear layer in its stable condition during the placing of the permanent backing on the wear layer. The finished product then moves off the suction roll, and the backing is now in position to hold the wear layer in a stable state.

BRIEF DESCRIPTION OF THE DRAWING

The FIGURE is a schematic elevation view of the laminating structure utilized to carry out the invention herein.

DESCRIPTION OF THE PREFERRED EMBODIMENT

The laminated floor product herein is made by taking a wear layer 2 with a temporary backing 4 and removing the temporary backing and adding to the wear layer a reinforcing layer 6 and a foam backing 8 which may have a secondary backing 10. These elements are combined to form the finished laminated product, which will have an upper wear layer, and adhesive, a reinforcing layer, a foam backing and possibly a secondary backing. The temporary backing 4 and the secondary backing 10 can be any conventional type of backing material. A good material to use will be a beater-saturated asbestos fiber felt, such as disclosed in Feigley U.S. Pat. No. 2,759,813, issued Aug. 21, 1956. The wear layer may be any conventional hard surface flooring material. The wear layer will have some type of pattern on its outer face, and the wear layer must be incapable of maintaining a stable dimension without some degree of support. A granulated linoleum composition or a vinyl resin mix can be laid on a backing material by a stenciling apparatus such as that shown in U. S. Pat. No. 3,133,312. This mix is then consolidated, but it is releasably held to the backing material because the backing material has been coated with a release agent. The woven scrim reinforcing layer and the foam material for the backing 8 are the same as that set forth in U.S. Pat. No. 3,360,422. Also, the adhesive used would be the same as that set forth in the above-mentioned patent.

Referring now to FIGURE, there is shown the apparatus which carries out the inventive process. The previously assembled wear layer 2 and temporary backing 4 are fed around an idler roll 12 which is adjacent a vacuum roll 14. As the backing and wear layer pass around the idler roll, they go into contact with the vacuum roll with the wear layer against the surface of the vacuum roll 14. The vacuum roll is so constructed that the vacuum within the roll is operative at a point shortly after the wear layer first contacts the surface of the vacuum roll. The wear layer is now held fast against the surface of the vacuum roll. The combination temporary backing and wear layer then passes between the vacuum roll and an idler roll 16. At this point, the backing is stripped from the wear layer leaving the wear layer now on the vacuum roll and supported dimensionally only by the vacuum roll. Not only does the vacuum roll support the wear layer dimensionally, but it prevents the tearing action of the backing removal from altering the dimensional characteristics of the wear layer. The wear layer then passes around to the nip of a consolidating structure which is composed of the vacuum roll 14 and a rubber-covered pressure roll 18. Into the nip of rolls 14 and 18 there is fed the wear layer, which is still held under vacuum against the surface of the vacuum roll 14, an adhesive 20 which is fed out of a conventional extruder 22, a reinforcing layer 6 and a foam layer 8 and possibly a secondary backing 10. Due to the presence of the adhesive, the wear layer is bonded to the foam layer with the reinforcing layer therebetween. The various components are assembled together as they pass through the nip of the consolidating structure. A vacuum is still maintained on the wear layer for a short distance beyond the nip of the consolidating structure. The vacuum action is then removed from the peripheral surface of the vacuum roll, and thus the consolidated structure is now free to move off the vacuum roll 14 and to be collected. The finished product 24 is now composed of a wear layer, an adhesive layer, a reinforcing layer, a foam backing and possibly a secondary backing.

The pattern on the surface of the wear layer was held in a dimensionally stable state by the temporary backing initially; then when it was removed from the temporary backing, it was held in a stable dimensional state by the vacuum roll, and finally the wear layer is held in its dimensionally stable state in the end product due to the existence of the reinforcing layer and foam material with its possible secondary backing. The wear layer is also held dimensionally stable during the temporary backing removal stage and the consolidating stage due to the presence of the vacuum roll. The end product now has a surface pattern which is still basically the same size as the pattern printed; therefore, adjacent sheets of flooring may be placed side to side and have a pattern match of one sheet relative to the pattern of the other sheet.

What is claimed is:

1. A method of assembling a floor covering comprising the steps of placing a wear layer on a strippable, temporary backing, feeding the wear layer and temporary backing combination to a vacuum means which will hold the wear layer in a dimensionally stable condition when stripping the backing from the wear layer, holding the wear layer without its backing in a dimensionally stable state on the vacuum means while passing the wear layer through the nip of a consolidating and laminating structure comprising the vacuum means and a roller, feeding into the same nip an adhesive, a reinforcing media and a foam backing to laminate these elements together to form a composite structure consisting of the wear layer, reinforcing medium and foam backing adhesively held together, maintaining the wear layer in its dimensionally stable state on the vacuum means during the consolidation and lamination process so that the consolidated product ends up with a pattern design on the wear layer which is dimensionally the same as the pattern design printed on the wear layer with its temporary backing, removing said consolidated product from the vacuum means.

* * * * *